(12) United States Patent
Chiang

(10) Patent No.: US 10,335,974 B2
(45) Date of Patent: Jul. 2, 2019

(54) TABLE SAW WITH SCALE SYSTEM

(71) Applicant: REXON INDUSTRIAL CORP., LTD., Taichung (TW)

(72) Inventor: Hung-Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 2 days.

(21) Appl. No.: 15/585,508

(22) Filed: May 3, 2017

(65) Prior Publication Data

US 2017/0320151 A1    Nov. 9, 2017

(30) Foreign Application Priority Data

May 4, 2016 (TW) .............................. 105113830 A

(51) Int. Cl.
*B23D 59/00* (2006.01)
*B27B 5/22* (2006.01)
*B23D 45/06* (2006.01)
*B23D 47/02* (2006.01)
*B27B 27/10* (2006.01)
*B27B 27/02* (2006.01)

(52) U.S. Cl.
CPC ............. *B27B 27/10* (2013.01); *B23D 45/06* (2013.01); *B23D 47/025* (2013.01); *B23D 59/001* (2013.01); *B27B 5/222* (2013.01); *B27B 27/02* (2013.01)

(58) Field of Classification Search
CPC ............... Y10T 83/773; Y10T 83/7684; Y10T 83/7593; Y10T 83/76; Y10T 83/7613; Y10T 83/7627; Y10T 83/764; Y10T 83/7647; Y10T 83/849; Y10T 83/857; Y10T 83/863; B23D 59/001; B23D 59/00; B23D 45/06; B23D 47/025; B27B 5/222; B27B 27/02; B27B 27/10; B27B 27/00; B27B 27/04; B27B 27/08
See application file for complete search history.

(56) References Cited

U.S. PATENT DOCUMENTS

| 2,806,493 | A | * | 9/1957 | Gaskell | ................... B23Q 3/005 144/253.1 |
| 6,148,703 | A | * | 11/2000 | Ceroll | ..................... B23Q 3/007 144/287 |
| 6,725,755 | B1 | | 4/2004 | Svetlik | |
| 6,786,122 | B2 | | 9/2004 | Svetlik | |
| 7,191,692 | B2 | | 3/2007 | Huang | |

(Continued)

FOREIGN PATENT DOCUMENTS

TW       M-270864       10/2004

*Primary Examiner* — Phong H Nguyen
(74) *Attorney, Agent, or Firm* — Bacon & Thomas, PLLC

(57) ABSTRACT

A table saw includes a worktable, a left extension frame and a right extension frame respectively slidably mounted at left and right sides of the worktable, a scale unit including a first scale, a second scale and a third scale respectively mounted at the worktable, the left extension frame and the right extension frame, and an indicator unit including a first indicator, a second indicator and a third indicator respectively disposed to aim at the first, second and third scales. Thus, when operating the table saw to cut a workpiece, the user can selectively pull out the left or right extension frame and use the corresponding scale and indicator for quickly judging the correctness of the length to be cut.

6 Claims, 4 Drawing Sheets

(56) References Cited

U.S. PATENT DOCUMENTS

| | | | |
|---|---|---|---|
| 7,322,266 B2 | 1/2008 | Lin | |
| 2005/0204883 A1* | 9/2005 | Huang | B23D 47/025 |
| | | | 83/438 |
| 2008/0282862 A1* | 11/2008 | Wise | B27B 27/02 |
| | | | 83/468.2 |
| 2009/0165624 A1* | 7/2009 | Brown | B23D 47/025 |
| | | | 83/477 |
| 2011/0048201 A1* | 3/2011 | Frolov | B27B 27/02 |
| | | | 83/446 |

* cited by examiner

TABLE SAW WITH SCALE SYSTEM

BACKGROUND OF THE INVENTION

1. Field of the Invention

The present invention relates to table saw technology and more particularly, to table saw that is equipped with a scale system for quickly marking the cutting length.

2. Description of the Related Art

On a table saw of conventional technology, a scale is provided at the edge of the worktable so that the operator can use the scale to control the cutting length of the workpiece. Further, for cutting a large size workpiece, an extension frame is provided at one side of the worktable. When the extension is pulled out, it can be used with the worktable together to support a large size workpiece for cutting.

In order for allowing the operator to read the cutting length of a large size workpiece after the extension frame is pulled out, Taiwan Patent M270864, issued to the present inventor, teaches the use of an automatic rewind tape measure in a rear guide rail of the extension frame. When the operator pulls out the extension frame, the automatic rewind tape measure is synchronously extended out. At this time, the operator can use a scale indicator to read the graduations on the automatic rewind tape measure. However, in this prior art design, the position of the automatic rewind tape measure is not easy for the operator to accurately read the readings, so the effect of practical application is not ideal.

SUMMARY OF THE INVENTION

The present invention has been accomplished under the circumstances in view. It is the main object of the present invention to provide a table saw, which allows selective use of different scales and indicators at different locations for quickly marking the cutting length when cutting a different size of workpiece.

To achieve this and other objects of the present invention, a table saw comprises a worktable, a left extension frame, a right extension frame, a scale unit and an indicator unit. The worktable comprises a first fixed rail and a second fixed rail respectively located at the opposing front and rear sides thereof. The left extension frame comprises a first left movable rail, a second left movable rail and a left support platform. The first and second left movable rails are respectively slidably mounted in the first and second fixed rails of the worktable. The left support platform is connected to one end of each of the first and second left movable rails, and movable with the first and second left movable rails toward or away from the left side of the worktable. The first and second right movable rails are respectively slidably mounted in the first and second fixed rails of the worktable. The right support platform is connected to one end of each of the first and second right movable rails, and movable with the first and second right movable rails toward or away from the right side of the worktable. The scale unit comprises a first scale, a second scale and a third scale. The first scale is located at the first fixed rail of the worktable. The second scale is located at the first left movable rail of the left extension frame. The third scale is located at the first right movable rail of the right extension frame. The indicator unit comprises a first indicator, a second indicator and a third indicator. The first indicator is located at one end of the first right movable rail of the right extension frame remote from the right support platform and aimed at the first scale. The second indicator is located at the front side of the worktable and aimed at the second scale. The third indicator is detachably mounted at the first right movable rail of the right extension frame and aimed at the third scale.

Thus, when the left and right extension frames are not extended out, the user can use the third scale and the third indicator to measure the cutting length of the workpiece. When pulled out the left extension frame, the user can use the second scale and the second indicator to measure the cutting length of the workpiece. When pulled out the right extension frame, the user can use the first scale and the first indicator to measure the cutting length of the workpiece. In other words, when cutting a different size of workpiece, the user can achieve the effect of quickly marking the cutting length by selectively using the scales and indicators at the three different locations.

Other advantages and features of the present invention will be fully understood by reference to the following specification in conjunction with the accompanying drawings, in which like reference signs denote like components of structure.

DETAILED DESCRIPTION OF THE INVENTION

Figure 1:
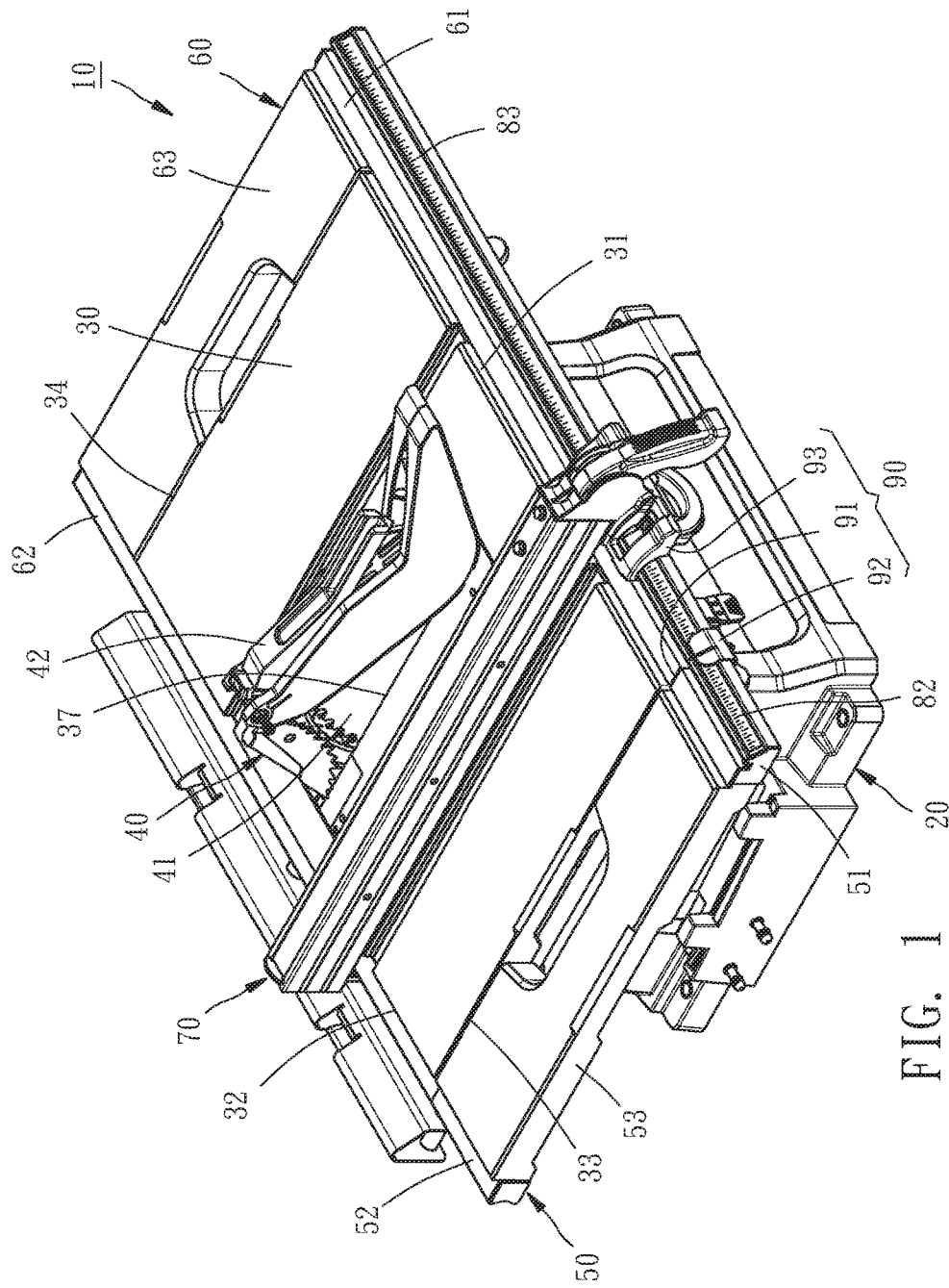
FIG. 1 is an oblique top elevational view of a table saw in accordance with the present invention, illustrating left and right extension frames in a received status.

Referring to FIG. 1, a table saw 10 in accordance with the present invention is shown. The table saw 10 comprises a base 20, a worktable 30, a cutting mechanism 40, a left extension frame 50, a right extension frame 60, a rip fence 70, a scale unit 80, and an indicator unit 90.

The base 20 is adapted for positioning on the floor.

Figure 2:
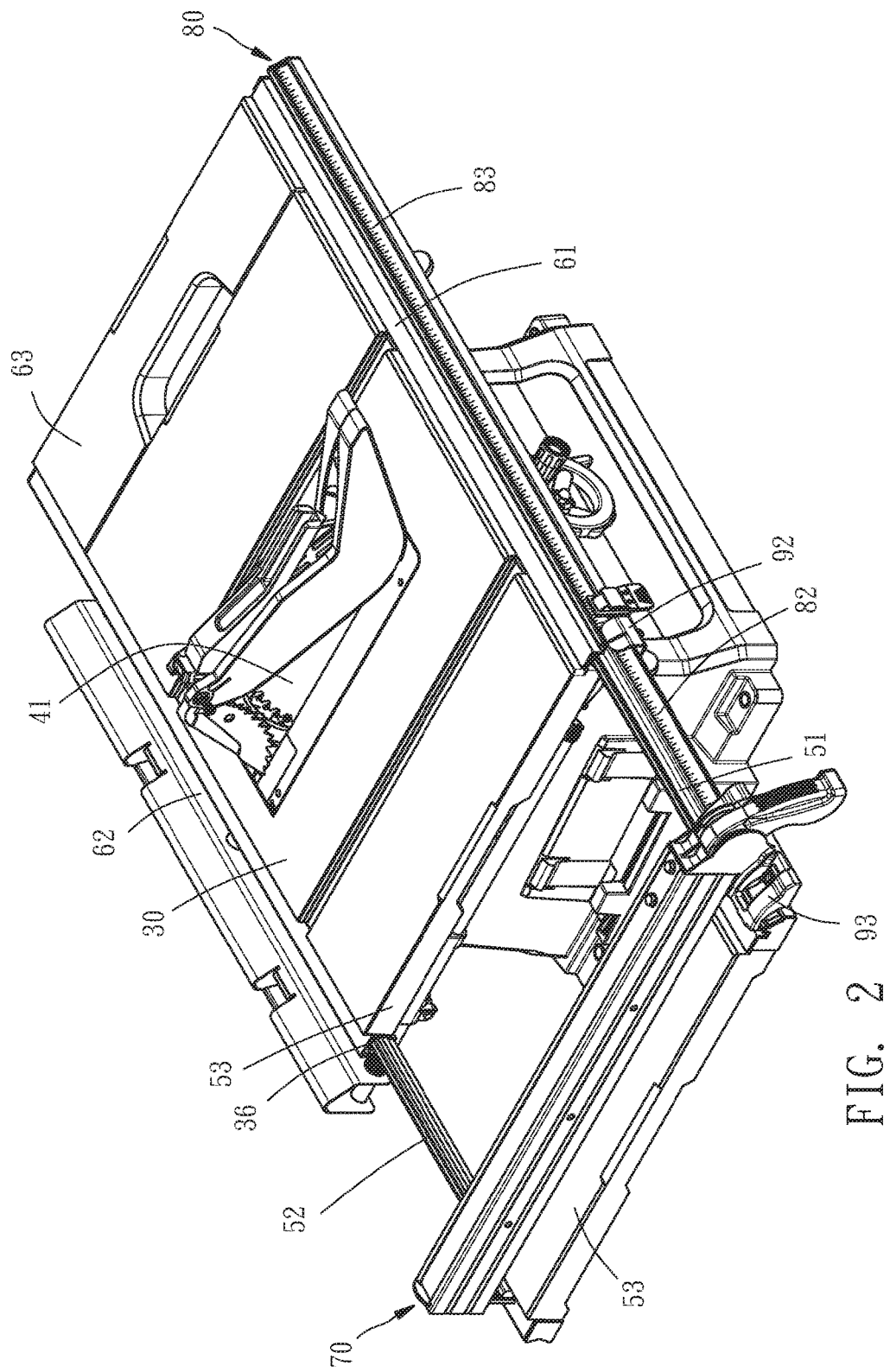
FIG. 2 corresponds to FIG. 1, illustrating the left extension frame pulled out of the worktable.

The worktable 30 is mounted on a top wall of the base 20 for supporting a workpiece. The worktable 30 defines a front side 31, a rear side 32, a left side 33 and a right side 34. As illustrated in FIG. 2, a first fixed rail 35 and a second fixed rail 36 are respectively mounted at the front side 31 and the rear side 32. Further, the worktable 30 has a cutting slot 37 on the middle.

The cutting mechanism 40 comprises power drive (not shown), a cutter blade 41 and a cutter blade guard 42. The power drive is mounted in the base 20. The cutter blade 41 is connected to the power drive and inserted through the cutting slot 37 of the worktable 30 so that the cutter blade 41 can be driven by the power drive to cut a workpiece. The cutter blade guard 42 surrounds a part of the cutter blade 41 and is disposed above the worktable 30 to prevent the surrounding person from accidentally touching the cutter blade 41 and being injured.

Figure 4:
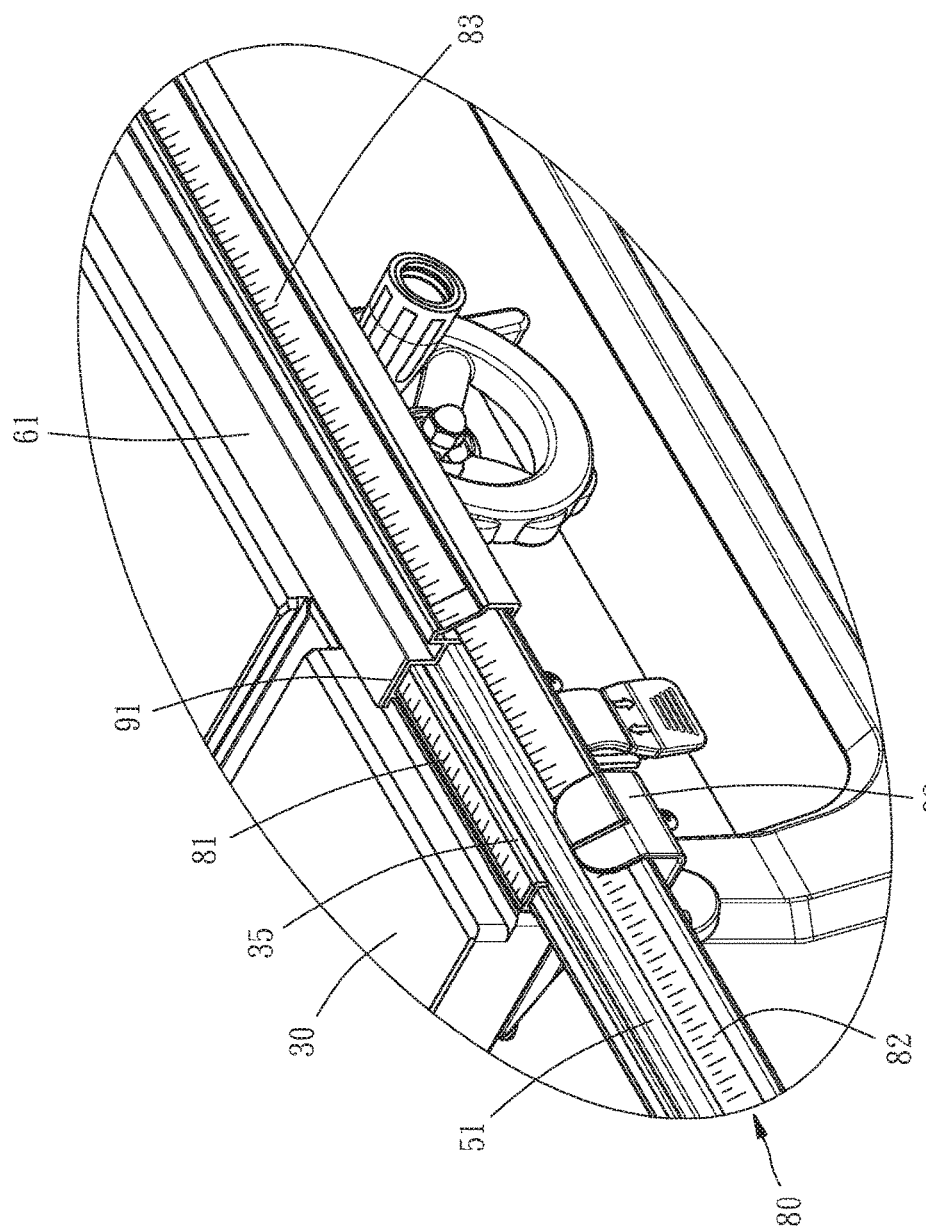
FIG. 4 is an enlarged view of a part of the present invention, illustrating the relative positioning relationship between the first, second and third scales of the table saw

As illustrated in FIGS. 1, 2 and 4, the left extension frame 50 comprises a first left movable rail 52, a second left movable rail 52 and a left support platform 53. The first and second left movable rails 51,52 are respectively slidably mounted in the first and second fixed rails 35,36 of the worktable 30. The left support platform 53 is connected to one end of each of the first and second left movable rails 51,52 so that the left support platform 53 is movable with the first and second left movable rails 51,52 toward or away from the left side 33 of the worktable 30.

As illustrated in FIGS. 1, 2 and 4, the right extension frame 60 comprises a first right movable rail 61, a second right movable rail 62 and a right support platform 63. The first and second right movable rails 61,62 are respectively and partially slidably mounted in the first and second fixed rails 35,36 of the worktable 30 and respectively and partially slidably mounted in the first and second left movable rails 51,52. The right support platform 63 is connected one end of each of the first and second right movable rails 61,62 so that the right support platform 63 is movable with the first and second right movable rails 61,62 toward or away from the right side 34 of the worktable 30.

The rip fence 70 is detachably and selectively mounted at the worktable 30, the left support platform 53 of the left extension frame 50 or the right support platform 63 of the right extension frame 60, and adapted for supporting one end of the workpiece to be cut to enhance cutting stability.

Figure 3:
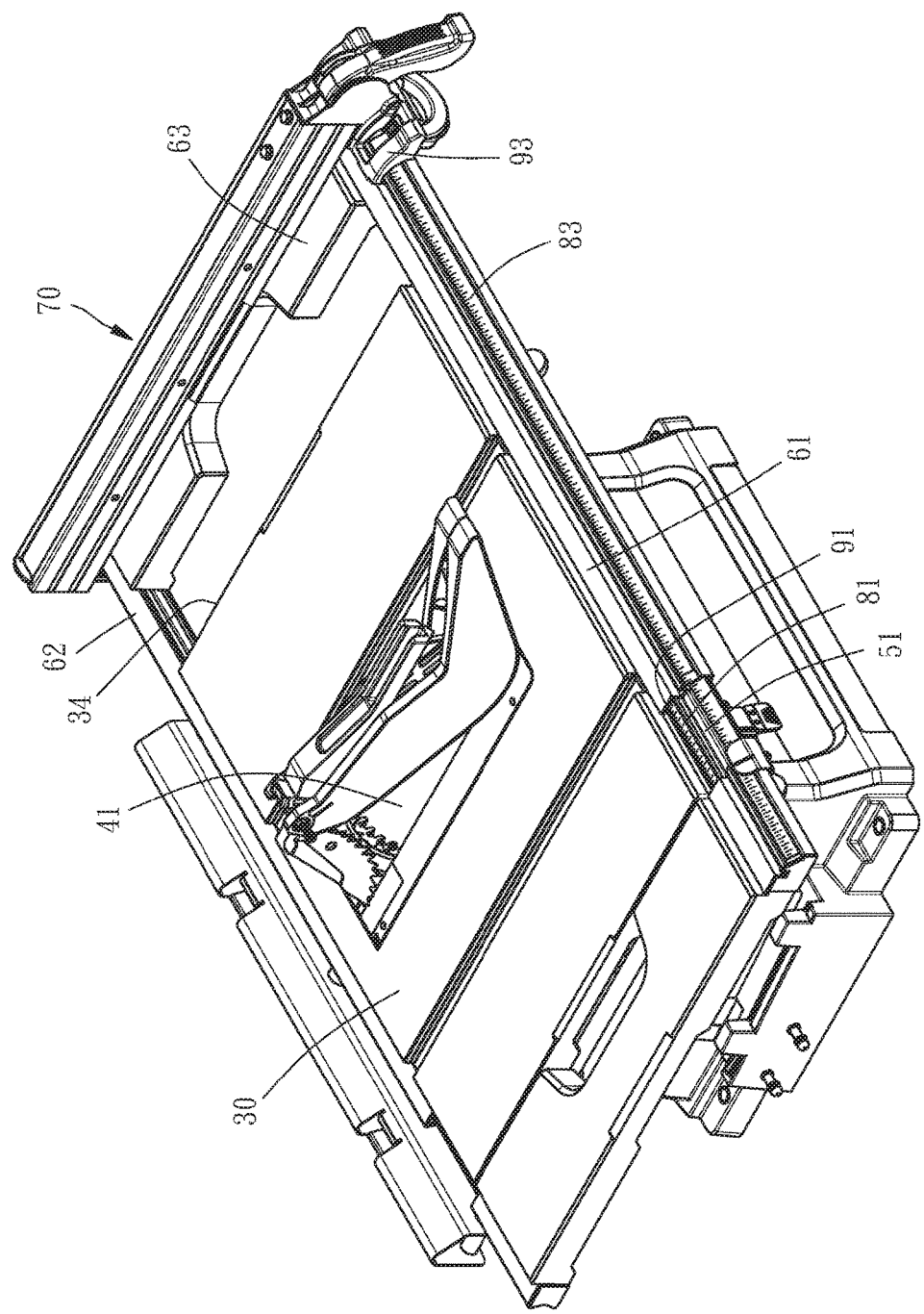
FIG. 3 corresponds to FIG. 1, illustrating the right extension frame pulled out of the worktable.

Referring to FIG. 4 again, the scale unit 80 comprises a first scale 81, a second scale 82 and a third scale 83. The first scale 81 is mounted on the outer surface of the first fixed rail 35 of the worktable 30 between the left side 33 of the worktable 30 and the cutter blade 41. When the right support platform 63 of the right extension frame 60 is abutted at the right side 34 of the worktable 30, as illustrated in FIG. 2, the first scale 81 is shielded by the first right movable rail 61 of the right extension frame 60. When the right support platform 63 of the right extension frame 60 is moved far from the right side 34 of the worktable 30, as illustrated in FIG. 3, the first scale 81 is not shielded by the first right movable rail 61 of the right extension frame 60 and can be seen. The second scale 82 is mounted at an outer surface of the first left movable rail 51 of the left extension frame 50. When the left support platform 53 of the left extension frame 50 is abutted at the left side 33 of the worktable 30, as illustrated in FIG. 1, the second scale 82 is partially shielded by the first right movable rail 61 of the right extension frame 60. When the left support platform 53 of the left extension frame 50 is moved far from the left side 33 of the worktable 30, as illustrated in FIG. 2, the second scale 82 is not shielded by the first rail movable rail 61 of the right extension frame 60 and can be seen. The third scale 83 is mounted at an outer surface of the first right movable rail 61 of the right extension frame 60, and constantly exposed to the outside, as illustrated in FIG. 1. Further, the graduations of the first scale 81 follow the graduations of the third scale 83, and the second and third scales 82, 83 have the opposite order of graduations.

The indicator unit 90 comprises a first indicator 91, a second indicator 92 and a third indicator 93. The first indicator 91 is located at one end of the first right movable rail 61 of the right extension frame 60 remote from the right support platform 63, as illustrated in FIG. 3, thus, when the right support platform 63 of the right extension frame 60 is disposed far from the right side 34 of the worktable 30, the first indicator 91 is aimed at the first scale 81. The second indicator 92 is located in the intersection between the front side 31 and left side 33 of the worktable 30, as illustrated in FIG. 3, thus, when the left support platform 53 of the left extension frame 50 is disposed far from the left side 33 of the worktable 30, the second indicator 92 is aimed at the second scale 82. The third indicator 93 is located at one end of the rip fence 70. When the rip fence 70 is mounted at the worktable 30, as illustrated in FIG. 1, the third indicator 93 is aimed at the third scale 83; when the rip fence 70 is mounted at the left support platform 53 of the left extension frame 50, as illustrated in FIG. 2, the third indicator 93 is aimed at the zero reading of the second scale 82; when the rip fence 70 is mounted at the right support platform 63 of the right extension frame 60, as illustrated in FIG. 3, the third indicator 93 is aimed at the zero reading of the third scale 83.

Thus, if the workpiece is shorter than the length of the worktable 30, as illustrated in FIG. 1, the user can mount the rip fence 70 at the worktable 30 without needing to extend out the left extension frame 50 or right extension frame 60. At this time, the distance between the rip fence 70 and the cutter blade 41 (i.e., the size of the workpiece after cutting) can measured using the third indicator 93 and the third scale 83.

If the workpiece is too long to be completely received by the worktable 30, the user can pull out the left extension frame 50 or right extension frame 60 according to the cutting position. If the left extension frame 50 has to be pulled out, as illustrated in FIG. 2, the user can mount the rip fence 70 at the left support platform 53 of the left extension frame 50 so that the left end of the workpiece can be abutted against the rip fence 70, enabling the worktable 30 and the left support platform 53 of the left extension frame 50 to support the workpiece jointly. At this time, the distance between the rip fence 70 and the cutter blade 41 (i.e., the size of the workpiece after cutting) can be measured using the second indicator 92 and the second scale 82.

If the right extension frame 60 has to be pulled out, as illustrated in FIG. 3, the user can mount the rip fence 70 at the right support platform 63 of the right extension frame 60 so that the right end of the workpiece can be abutted against the rip fence 70, enabling the worktable 30 and the right support platform 63 of the right extension frame 60 to support the workpiece jointly. At this time, the distance between the rip fence 70 and the cutter blade 41 (i.e., the size of the workpiece after cutting) can be measured using the first indicator 91 and the first scale 81.

In conclusion, the table saw 10 provided by the present invention allows the user to selectively use the three scales 81~83 and the mating indicators 91-93 at three different locations to indicate the cutting length, enhancing the effect of operational convenience.

What is claimed is:

1. A table saw, comprising:
   a worktable comprising a front side, a rear side, a left side and a right side, a first fixed rail mounted at said front side, and a second fixed rail mounted at said rear side;
   a left extension frame comprising a first left movable rail, a second left movable rail and a left support platform, said first movable rail and said second left movable rail being respectively slidably mounted in said first fixed rail and said second fixed rail of said worktable, said left support platform being connected to one end of said first left movable rail and one end of said second left movable rail and movable with said first left movable rail and said second left movable rail toward or away from said left side of said worktable;
   a right extension frame comprising a first right movable rail, a second right movable rail and a right support platform, said first right movable rail and said second right movable rail being respectively and partially slidably mounted in said first fixed rail and said second fixed rail of said worktable and respectively and partially slidably mounted in said first left movable rail and said second left movable rail, said right support platform being connected to one end of said first right movable rail and one end of said second right movable rail and movable with said first right movable rail and said second right movable rail toward or away from said right side of said worktable;

a scale unit comprising a first scale mounted at an outer surface of said first fixed rail of said worktable, a second scale mounted at an outer surface of said first left movable rail of said left extension frame and a third scale mounted at an outer surface of said first right movable rail of said right extension frame; and an indicator unit comprising a first indicator mounted at one end of said first right movable rail of said right extension frame remote from said right support platform and aimed at said first scale, a second indicator mounted at said front side of said worktable and aimed at said second scale, and a third indicator detachably mountable at said first right movable rail of said right extension frame and to aim at said third scale; and a rip fence detachably and selectively mounted at said worktable, said left support platform of said left extension frame or said right support platform of said right extension frame; said third indicator is selectively mounted at one end of said rip fence so that when said rip fence is mounted at said worktable, said third indicator is aimed at said third scale; when said rip fence is mounted at said left support platform of said left extension frame, said third indicator is aimed at a reading of said second scale that indicates a length between the end of the workpiece and the saw blade; when said rip fence is mounted at said right support platform of said right extension frame, said third indicator is aimed a reading of said third scale that indicates a length between the end of the workpiece and the saw blade.

2. The table saw as claimed in claim 1, wherein when said left support platform of said left extension frame is abutted against said left side of said worktable, said second scale is partially shielded by said first right movable rail of said right extension frame; when said left support platform of said left extension frame is moved far from said left side of said worktable, said second scale is exposed to the outside of said first right movable rail of said right extension frame.

3. The table saw as claimed in claim 1, wherein when said right support platform of said right extension frame is abutted against said right side of said worktable, said first scale is partially shielded by said first right movable rail of said right extension frame; when said right support platform of said right extension frame is moved far from said right side of said worktable, said first scale is exposed to the outside of said first right movable rail of said right extension frame.

4. The table saw as claimed in claim 1, wherein the graduations of said first scale follow the graduations of said third scale.

5. The table saw as claimed in claim 1, wherein said second and third scales have the opposite order of graduations.

6. The table saw as claimed in claim 1, further comprising a cutter blade disposed in a middle part of said worktable; said first scale is disposed between said left side of said worktable and said cutter blade.

* * * * *